O. P. VROOM.
HAY STACKER.
APPLICATION FILED SEPT. 14, 1918.

1,305,420.

Patented June 3, 1919.
3 SHEETS—SHEET 1.

Witness
J R Tanen

Inventor
O. P. Vroom
By C A Snow & Co.
Attorneys.

O. P. VROOM.
HAY STACKER.
APPLICATION FILED SEPT. 14, 1918.
1,305,420.
Patented June 3, 1919.
3 SHEETS—SHEET 2.
Fig. 4.
Fig. 2.
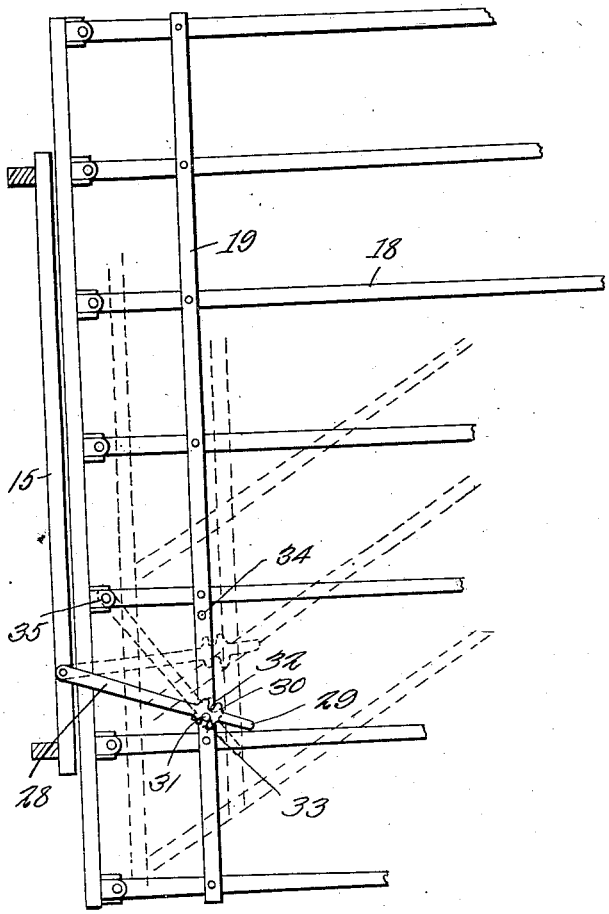
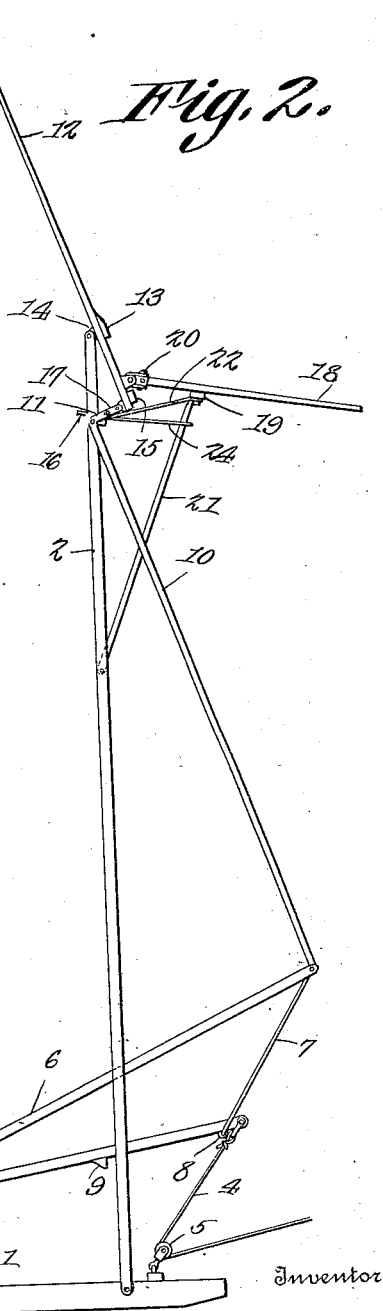
Witness
Inventor,
O. P. Vroom
By C. A. Snow & Co.
Attorneys.

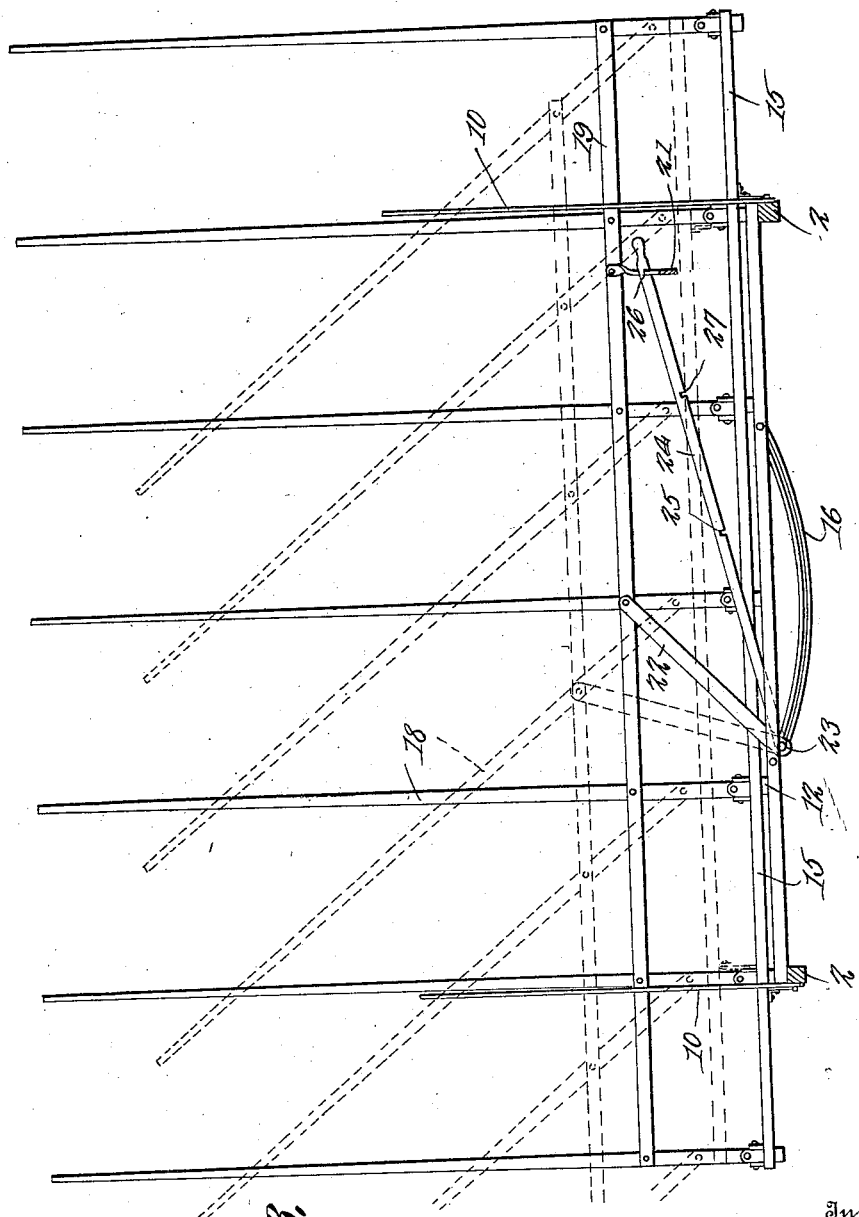

UNITED STATES PATENT OFFICE.

OLER P. VROOM, OF LINNEUS, MISSOURI, ASSIGNOR TO SUPERIOR HAY STACKER MFG. CO., OF LINNEUS, MISSOURI.

HAY-STACKER.

1,305,420.  Specification of Letters Patent.  Patented June 3, 1919.

Application filed September 14, 1918.  Serial No. 254,089.

*To all whom it may concern:*

Be it known that I, OLER P. VROOM, a citizen of the United States, residing at Linneus, in the county of Linn and State of Missouri, have invented a new and useful Hay-Stacker, of which the following is a specification.

This invention relates to hay stackers of the "over-shot" type. Machines of this character have been objectionable heretofore because they have delivered the hay straight over and always at the same point, thus necessitating the carrying of portions of the hay to the ends of the rick. It is an object of the invention to provide a structure of this character which can be adjusted to deliver hay either straight from the stacker or to the right or left of the center.

Another object is to provide a stacker the parts of which are so arranged and operated as to cause the elevated hay to slide therefrom, instead of roll as heretofore, the teeth of the stacker head being shiftable angularly to guide the sliding hay in the desired direction.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as set forth in the appended claims.

In the accompanying drawings the preferred form of the invention has been shown.

In said drawings—

Fig. 2 is a similar view showing the stacker head in raised or delivering position.

Fig. 3 is an elevation of the stacker head, the adjacent structure being shown in section on line 3—3, Fig. 1, and the teeth being shown, by dotted lines, in one of the positions to which they may be adjusted.

Fig. 4 is a view similar to Fig. 3 and showing another form of the device.

Figure 1:
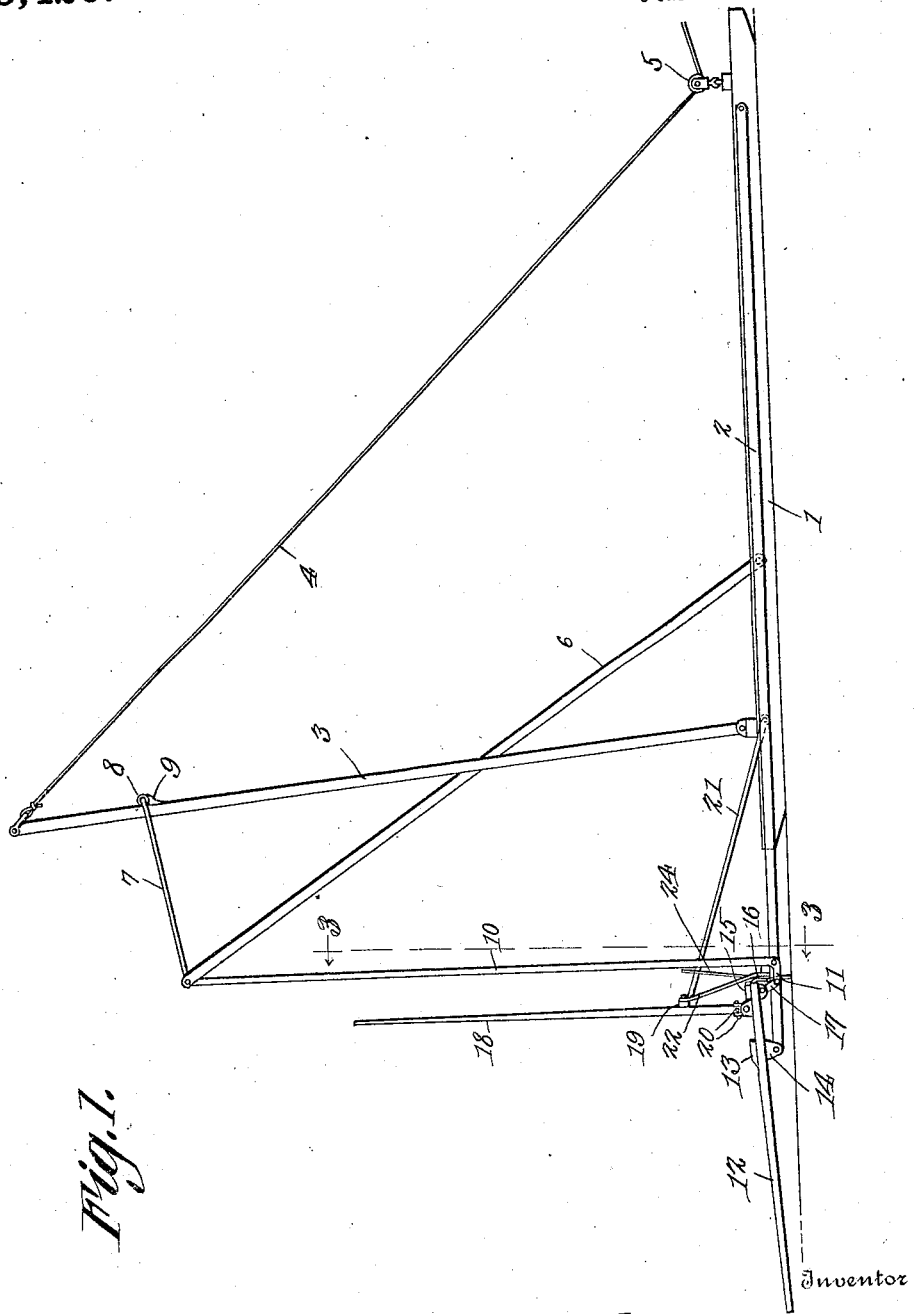
Figure 1 is a side elevation showing the stacker head in lowered or load receiving position.

Referring to the figures by characters of reference, 1 designates the main supporting structure of the stacker and a stacker arm 2 is connected to one end portion of this structure and is adapted to swing upwardly and downwardly relative thereto. A mast 3 is hingedly connected to the other end portion of the supporting structure and is normally supported in an elevated position by a cable 4 extending from the upper end thereof downwardly under a sheave 5 to the power employed for operating the stacker. A spar 6 is hingedly connected to an intermediate portion of the structure 1 and crosses the mast 3, the upper end of the spar being coupled to the mast by a link 7 which is pivotally connected at one end to the upper end of the spar and carries at its other end a roller 8 designed to have a limited movement along the mast 3, such movement being limited upwardly by the cable 4 and downwardly by a stop 9. Carrier bars 10 are pivotally connected at their upper ends to the upper portion of the spar 6 and the lower portions are pivotally attached to the stacker arm 2, there being an arm extending at an angle from the lower portion of each of the bars, as shown at 11.

Tiltably connected to the end of the arm 2 is the head 12 of the stacker, said head consisting of parallel tines connected, between their ends, by a cross strip 13 from which extend bearing members 14 connected to the arm 2. Another cross strip 15 connects the rear or inner ends of the tines of the head 12 and extending downwardly therefrom is a centrally located arcuate guide 16. Links 17 connect the arms 11 to the inner end of the stacker head 12, as shown.

Connected to the stacker head 12 close to the strip 15 are delivery tines 18 pivotally attached to a cross bar 19 and connected at their lower ends by suitable universal joints 20, to the head 12. A brace 21 is connected at one end to the arm 2 and, at its other end, to the bar 19. A radius bar 22 is pivotally attached to the center of the bar 19 and its lower end has a stud 23 which is slidably mounted on the arcuate guide 19. To this slidable end portion of the radius bar is connected one end of an adjusting lever 24 having notches 25, 26 and 27 therein any one of which is adapted to receive the edge portion of the brace 21.

Under normal conditions the stacker head is resting on the ground as shown in Fig. 1. By shifting lever 24 to bring the middle notch into position to receive the edge of brace 21 the radius bar 22 will be brought to position parallel with the tines 18 and at right angles to the strip 15. Thus when the cable 4 is pulled longitudinally the mast 3 will be drawn down and will pull, through the link 7, upon the spar 6 which, in turn, will pull through the bars 10 upon the arm 2 and cause the stacker head 12 to rise to the position shown in Fig. 2 where the load will be discharged. During this operation the arms 11 will push, through links 17, against the inner end of the head 12 without, however, producing any new result, and the load will slide off of the elevated tines 18 in the usual manner.

Should it be desired to direct the load to the right or to the left of the center, while being delivered, the lever 24 is first shifted to bring the notched portion 25 or 26 in engagement with the brace 21. This results in the following new action: The radius bar 22 being held by the lever 24 at one extreme end of the guide 16 (see Fig. 3) will maintain the tines 18 in upstanding positions, as shown by full lines in said figure, although the angle of the tines relative to the tines of the head 12 will be somewhat increased. The load is then placed on the stacker head and during the thrust by the links 17 against and the tines 18 will be increased thus causing the inner end of the head to thrust, through the shifted bar 22, against the bar 19, shifting said bar longitudinally and causing the tines 18 to swing laterally, as shown by dotted lines in Fig. 3. Thus the load can not only slide off of the tines 18 when elevated, due to the tilting of the tines and the greater pitch resulting therefrom, but the said load will be guided laterally by the shifted tines, with the result that the load will be discharged to the right or to the left of the center, this depending on the adjustment of the lever 24 and radius bar 22. As the load will slide off of the tines instead of roll, the direction of delivery can be controlled readily by the means described and the hay will not become tangled as in the ordinary rolling delivery from an overshot stacker.

Instead of using the structure shown in Figs. 1, 2 and 3, the parts 16, 22 and 24 can be dispensed with and in lieu thereof a link 28 can be used, this link being pivotally connected to the strip 15 on the head 12 and terminating, at its free end, in a handle or grip 29, thus to form a lever. This lever has an enlarged portion 30 in opposite sides of which are formed recesses 31 and 32 and extending from the bar 19 are spaced pins 33 and 34. By grasping the grip 29 and shifting the lever or link 28 so as to seat the pin 33 in recess 31 the tines 18 will be swung laterally in one direction when brought to discharging position, as will be obvious. By placing the pin 34 in the other recess 32, the tines 18 will be swung to the other side. When it is desired to hold the tines 18 against lateral swinging when brought to delivering position, the lever or link 28 is disconnected from the strip 15, swung about its connection with the pin 33, and attached to the butt end of the adjacent tine 18, as shown at 35. The lever or link 28 thus forms a brace which holds the tines against lateral swinging.

What is claimed is:—

1. In a hay stacker a stacker head including connected tines, delivery tines mounted to swing toward and from the head and laterally relative thereto, means for raising and lowering the head to and from delivery position, means operated by the raising of the head for increasing the angle between the delivery tines and the tines of the head, and means for swinging the delivery tines to one side during such movement.

2. In a hay stacker of the over-shot type, a stacker head, delivery tines movably connected thereto and extending at an angle therefrom, means for raising the stacker head to delivery position, and means operated by such movement of the stacker head for simultaneously increasing the angle between the head and the delivery tines and swinging said tines laterally.

3. In a hay stacker of the over-shot type, a stacker head, delivery tines extending at an angle therefrom, means for elevating the head, and means operated by such movement for swinging the tines laterally relative to the head.

4. In a hay stacker of the over-shot type, a stacker head, delivery tines extending at an angle therefrom, means for elevating the head, and adjustable means operated by such movement of the head for swinging the tines laterally to deliver the load to either side of the center.

5. In an over-shot hay stacker, elevating mechanism, a stacker head hingedly connected thereto, delivery tines connected to the head by universal joints, means operated by the elevation of the head for increasing the angle between the head and the tines, and means for swinging the tines laterally in either direction during said change of angle.

6. In an over-shot hay stacker, elevating mechanism, a stacker head hingedly connected thereto, delivery tines connected to the head, a carrier bar actuated by said mechanism, an arm and link connection between said bar and the head for shifting the head and tines to change the angle therebetween during the elevation of the head, and a brace connecting the tines to the elevating mechanism.

7. In an over-shot stacker, elevating mechanism including a stacker arm, a stacker head hingedly mounted thereon, delivery tines movably connected to and extending at an angle from the head, a connection between said tines and the stacker arm, a carrier bar pivotally connected to the stacker arm, and arm and link connection between said bar and the inner end of the stacker head, and means connected to the carrier bar for elevating the stacker arm and head, said bar and connections coöperating to increase the angle between the head and the delivery tines during the elevation of the head to delivery position.

8. In an over-shot stacker, a stacker arm, a head hingedly connected thereto, delivery tines movably connected to the head, a brace for anchoring the tines to the stacker arm, a member pivotally and detachably connected to the stacker head, spaced devices movable with the delivery tines, said pivoted member being shiftable into engagement with either of said devices and coöperating therewith to impart lateral swinging movement to the delivery tines when the tines are elevated to delivering position, and means for securing the pivoted member to an adjoining tine, when detached from the stacker head, thereby to constitute a brace and hold the tines against lateral swinging movement.

In testimony that I claim the foregoing as my own, I have hereto affixed my signature in the presence of two witnesses.

OLER P. VROOM.

Witnesses:
H. C. TAGGART,
V. B. CLARK.

Copies of this patent may be obtained for five cents each, by addressing the "Commissioner of Patents, Washington, D. C."